United States Patent [19]

Hundenborn et al.

[11] Patent Number: 5,256,264

[45] Date of Patent: Oct. 26, 1993

[54] PROCESS AND APPARATUS FOR THE IN-SITU DECONTAMINATION OF GROUND WATER CONTAINING HEAVY METALS

[75] Inventors: Bernd Hundenborn; Hubert Theissen, both of Berlin, Fed. Rep. of Germany

[73] Assignee: Santec GmbH Ingenieurburo fur Sanierungstechnologien, Berlin, Fed. Rep. of Germany

[21] Appl. No.: 785,747

[22] Filed: Oct. 31, 1991

[30] Foreign Application Priority Data

Nov. 5, 1990 [DE] Fed. Rep. of Germany ....... 4035110

[51] Int. Cl.$^5$ ............................................. C02F 1/46
[52] U.S. Cl. ................................ 204/149; 204/130; 204/180.1; 210/688; 210/748
[58] Field of Search ............ 204/130, 149, 182.2, 204/180.1; 210/688, 748

[56] References Cited

U.S. PATENT DOCUMENTS 5,074,986 12/1991 Prabstein et al. .................... 204/130
5,098,538 3/1992 Kim et al. .......................... 204/182.2
5,137,608 8/1992 Acar et al. ........................... 204/130

FOREIGN PATENT DOCUMENTS 0328993 2/1989 European Pat. Off. .
3842740A1 6/1990 Fed. Rep. of Germany .
9005565.9 8/1990 Fed. Rep. of Germany .
52-048202 4/1977 Japan .
WO9101392 2/1991 PCT Int'l Appl. .
2150597A 7/1985 United Kingdom .

Primary Examiner—John Niebling
Assistant Examiner—Arun S. Phasge
Attorney, Agent, or Firm—Jacobson, Price, Holman & Stern

[57] ABSTRACT

A process and apparatus for the in-situ decontamination of ground water polluted with heavy metal ions, wherein a ground water peak (26) is built up by means of gasification (24) in a well pipe (10), and a current is produced in the ground water. The current is conducted through a siphon (18, 44, 46) furnished with an ion exchanger (50), and the heavy metal ions from the water current migrate to the ion exchanger by the application of electrical voltage (48).

7 Claims, 2 Drawing Sheets

PROCESS AND APPARATUS FOR THE IN-SITU DECONTAMINATION OF GROUND WATER CONTAINING HEAVY METALS

BACKGROUND OF THE INVENTION

The invention relates to a process for the in situ decontamination of ground water containing heavy metals, and an apparatus for implementing this process.

It is known that heavy metals are present in ionized form in the ground and can be removed from ground water when the latter is made to flow past an appropriately positioned ion exchanger.

BRIEF SUMMARY OF THE INVENTION

The object of the invention is to provide an operating process and apparatus for solving problems associated with the above ion exchange process.

In the process and apparatus of the invention, ground water is caused to flow past an ion exchanger in an approximately laminar flow. With the application of a corresponding voltage gradient the heavy metal ions are conducted to an ion exchange mass. The latter is distinguished by the fact that it has a greater affinity for the heavy metal ions than its charging ions. The result is that the heavy metal ions reaching the ion exchange mass are captured in the latter. The ion exchanger can be replaced at regular intervals and/or be externally regenerated.

BRIEF DESCRIPTION OF THE DRAWINGS

Further details, advantages, and features of the invention will appear from the following detailed description and accompanying drawings, to which express reference is made for the disclosure of all details not more specifically described in the text, and wherein.

DETAILED DESCRIPTION

Figure 1:
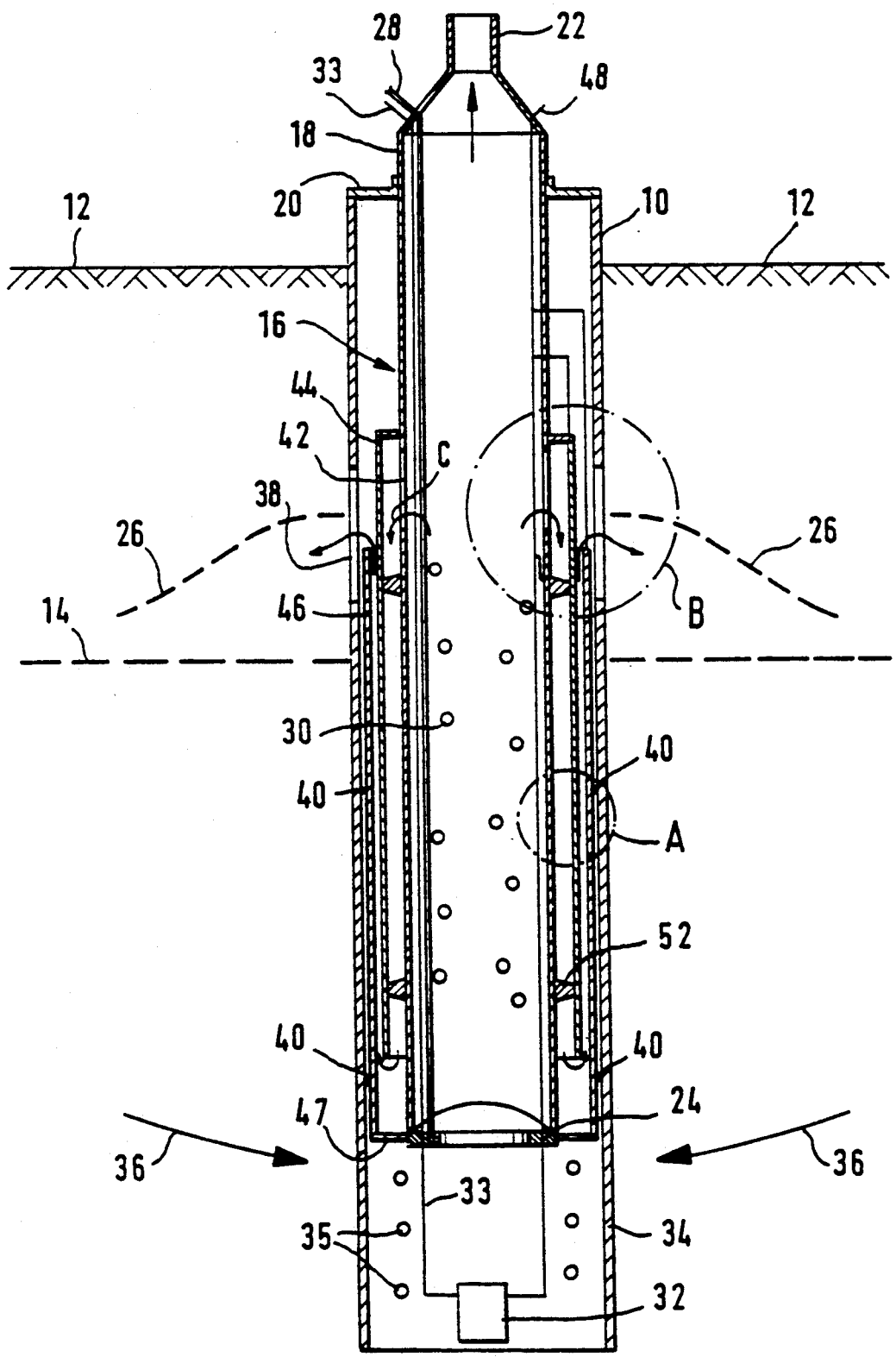
FIG. 1 is a schematic cross-sectional view of a heavy metal decontaminating well of the invention inserted into the ground.

FIG. 1 shows a well pipe 10 sunk into the earth and projecting somewhat from the ground surface 12, while its lower end is sealed and penetrates far beneath the ground water table 14.

The inside of well pipe 10 can be adjusted in height and is concentric relative to the ion exchanger insert 16 inserted therein. Ion exchanger insert 16 has an inner pipe 18 which is held in its concentric position by means of an insert mount 20, which seals off the well pipe 10 from above (as well as by means of inflatable seals further explained below). At its upper end the inner pipe is sealed by means of an exhaust cone 22 and at its lower end has a gasifier 24, which builds up a ground water peak 26 in the area of the heavy metal decontamination well as the result of a pressure increase, such that the ground water table in the area of the ground water peak is above the natural water table 14, as the figure shows.

To this end, appropriate fresh gas is fed to the gasifier 24 by means of a gas feed line 28. The gas employed may simply be air. Gas bubbles 30 then rise above the gasifier 24 within the inner pipe 18 and entrain the water located there, thereby creating the ground water peak 26.

Positioned below the gasifier 24 is a sludge trap 32, which is fed with the needed electrical energy by means of a cable line 33.

Outside of the gasifier, the inner pipe 18 is open at its lower end. This results in an eddy effect exerted on the ground water due to the upward flow within the inner pipe, as indicated by the arrow 36. The ground water 36 thus flows through corresponding holes 35 which are positioned in the lower area of the well pipe 10, beneath the lower end of the ion exchange insert, and which represent a preliminary filter 34. The well pipe 10 does more than just function as the preliminary filter 34 for the upward flow of the ground water. At the same height as the outflow openings of the ion exchange insert 16 it is also furnished with off-flow openings, by means of which the ground water peak above the ground water table 14 can flow back into the ground. Inflatable seals 40 are positioned between the well pipe 10 and the outer wall of the ion exchange insert 16, in the manner shown in the figure, in order to center the ion exchange insert 16 and to prevent parasitic currents which might somewhat reduce the effect of the heavy metal decontamination process.

Figure 3:
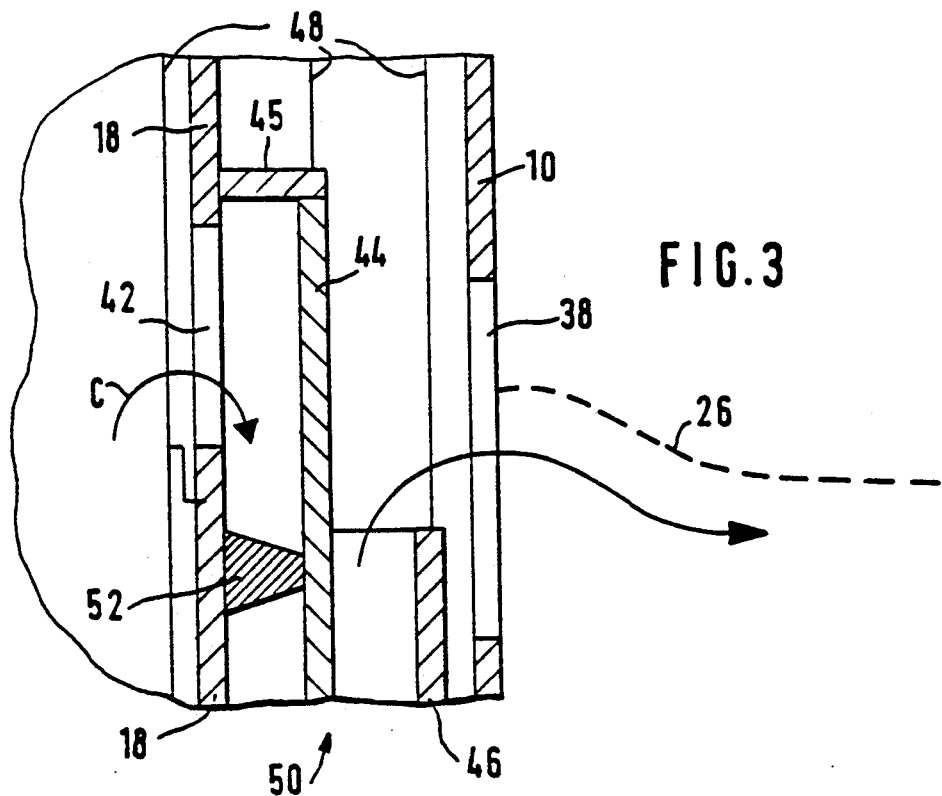
FIG. 3 is a partial view of FIG. 1 in circle B thereof.

As can be seen from FIG. 1 and even better from FIG. 3, in the area of the ground water peak 26 the inner pipe 18 has overflow openings in the form of overflow slots 42. For a better understanding of the flow behavior, the design of the ion exchanger insert will now be explained in greater detail. The inner pipe 18 is encompassed in concentric fashion by an inner pipe section 44. The latter is connected with the outer wall of the inner pipe by means of a circular lid 45. The cylindrical wall of the inner pipe section 44 extends from there to the closed floor of the ion exchange insert 16 and is supported by the outer wall of the inner pipe by means of spacers 52. Finally, the inner pipe section 44 displays a correspondingly larger diameter than the inner pipe. The inner pipe section 44 is surrounded by an outer pipe section 46, which is connected with the inner pipe 18 at the bottom by means of a circular base floor 47 but remains open at the top. The upper end of the outer pipe section 46 rests in the area between the overflow slots 42 of the inner pipe 18 and the off-flow openings 38 of the well pipe 10. The diameter of the outer pipe section 46 is expediently selected so that the flow cross-section between the outer pipe section 46 and the inner pipe section 44 is equal to the flow cross-section between the inner pipe 18 and the inner pipe section 44. This means that the difference in diameter between outer pipe section 46 and inner pipe section 44 must be somewhat smaller than the difference in diameter between the inner pipe section 44 and the inner pipe 18.

Figure 2:
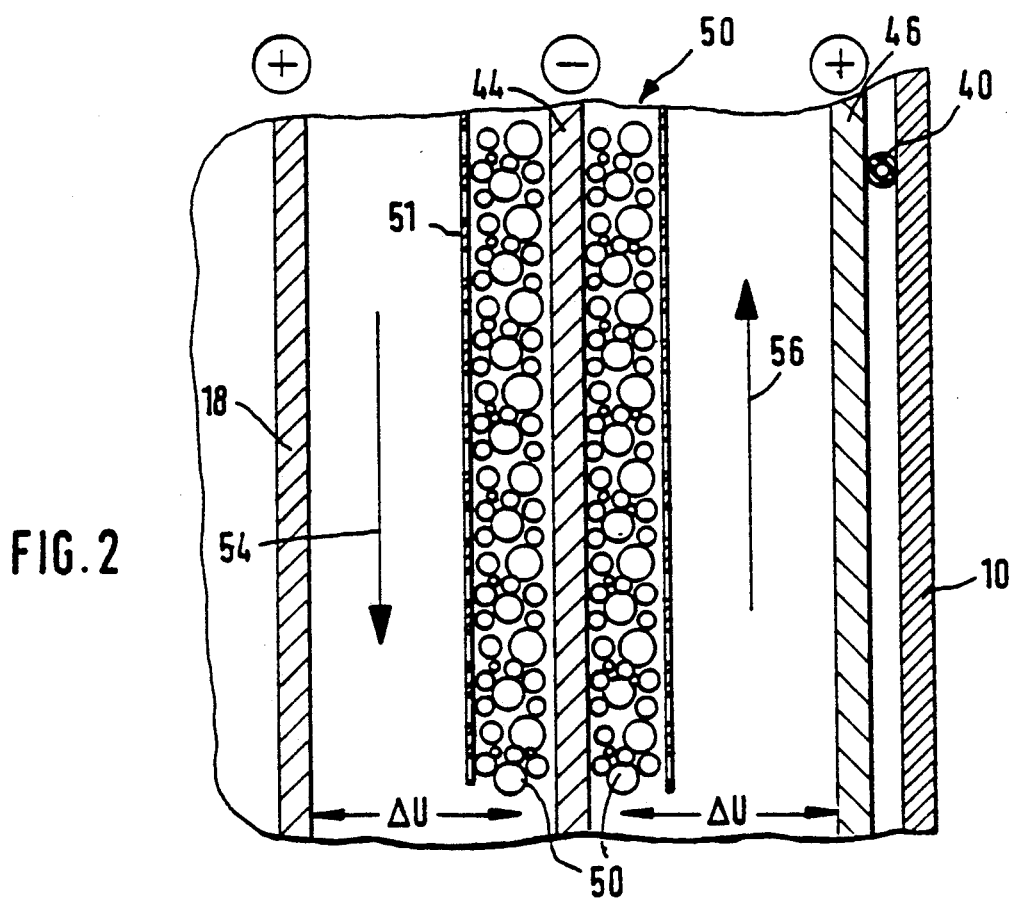
FIG. 2 is a partial view of FIG. 1 in circle A thereof.

The above explanation of the structure of the ion exchanger insert 16 shows that water overflowing from the inner pipe 18 into the ion exchanger insert 16 (see arrow C) in the area of the ground water peak 26 runs through a kind of siphon through the actual ion exchanger 50 in a largely laminar flow (FIG. 3). The long flow path permits a highly effective removal of the heavy metal ions. The laminar flow is indicated by the arrows 54 and 56 (FIG. 2).

FIG. 3 shows the design of the ion exchanger in detail. By means of electric current lines 48 a voltage gradient u is applied to the ion exchanger 50, as indicated by the figure. To this end the outer pipe section 46 and the inner pipe 18 are brought to the same potential, while the inner pipe section 44 serves as a counterelectrode. To achieve ion exchange, this counterelectrode is surrounded with an ion exchange mass that is secured in the area of this electrode by concentric perforated plates 51 of non-electrically conductive material. The ion exchange mass employed must have a greater affinity to the heavy metal ions than to the loading ions initially present in the ion exchange mass. The voltage gradients cause the heavy metal ions to migrate to the ion exchange mass. The heavy metal ions can easily penetrate the holes of the perforated plates 51, while the hole diameter is smaller than the granular size of the ion exchange mass. The latter is thus secured there.

Further specific details will now be described. With a flow speed of v (m/s), where m is ground water flow and s is the siphon of the water through the siphon and with a siphon height (distance of the lower end of the inner pipe section 44 from the upper end of the outer pipe section 46) of h(m), the mean residence time of a heavy metal ion in the siphon is $t = h/v(s)$. In order that during this predetermine residence time an ion can reliably migrate through the maximum distance b separating the electrodes (distance of inner pipe 18 from inner pipe section 44 or distance of inner pipe section 44 from outer pipe section 46), the applied voltage gradient must be $\Delta u = b/tw$ (V/m), where V is the voltage, given a migration speed of w (m$^2$/Vs). It is then assured that within residence time t, all heavy metal ions will move into the ion exchange mass 50 and be held there.

Given continuous operation of the apparatus with this kind of voltage gradient, a counter potential can build up at the electrodes. Intermittent operation is desirable to prevent this. The apparatus can therefore be alternatively operated in such a way that the voltage gradient is increased by a multiple of the above-produced threshold value for u, such that $\Delta u' = n\Delta u$. By the fact that the migration speed increases by a factor of n, the voltage can remain cut off during a period $((n-1)/n)$ t. During the cutoff time the counter potential will break down. Nonetheless the affinity of the ion exchange mass to the heavy metal ions will prevent a return diffusion of the heavy metal ions into the water flowing by during the cutoff time.

The energy supply of the ion exchanger 50 is so designed that only very slight flows are possible. This prevents a separation of the heavy metal at the electrode. In this manner the ion exchanger insert 16, which is mounted in the apparatus in such a way as to permit its replacement, can be easily regenerated.

It is to be understood that the operating conditions are to be adapted to the given type of heavy metal contamination, the conductivity of the water, and its pH value.

We claim:

1. Process for the in-situ decontamination of ground water containing heavy metals, comprising:
   introducing pressurized gas into the ground area beneath the water table to produce a local elevation of the ground water table in the area of gasification and create circulating flow of the ground water;
   applying an electric potential to a portion of the ground water flow resulting from the circulation of the ground water; and
   capturing in an ion exchanger the heavy metal ions migrating from the ground water flow under the influence of the electric potential.

2. The process as claimed in claim 1, wherein said application of electric potential comprises:
   applying a voltage gradient in a direction perpendicular to said ground water flow.

3. The process as claimed in claim 2 and further comprising:
   applying said voltage gradient continuously.

4. The process as claimed in claim 2 and further comprising:
   increasing said voltage gradient by a predetermined multiple; and
   intermittently applying said voltage gradient.

5. The method as claimed in claim 1 and further comprising:
   inserting a well pipe having a lower end into the ground so that said lower end extends to a point below the ground water table;
   inserting an ion exchange insert within said well pipe so that the lower end thereof extends to a point below said ground water table, said ion exchange insert having an inner pipe, an inner pipe section in concentrically spaced relation around said inner pipe, and an outer pipe section in concentrically spaced relation around said inner pipe section so that said inner pipe and inner and outer pipe sections form a siphon means, said inner pipe section being an intermediate partition wall for the flow of ground water through the spaces between said inner pipe and partition wall and said partition wall and outer pipe section, said spaces having ion exchange material therein,
   feeding said gas to the lower end of said inner pipe for producing a gas flow upwardly within said inner pipe and raising said ground water within said inner pipe to a ground water peak having an upper rim above said water table;
   feeding said ground water from said inner pipe to said siphon means;
   siphoning said ground water through said siphon means and said ion exchange material;
   returning said ground water from said siphon means at the upper end portion of said outer pipe section to the ground; and
   applying said electrical potential by applying a voltage gradient ($\Delta u$) between said partition wall and at least one of said inner pipe and outer pipe sections in a directions transversely to said ground water flow through said siphon means for producing migration of said heavy metal ions in said ground water flow to said ion exchange material for capture therein.

6. The method as claimed in claim 5 wherein:
   said voltage gradient satisfies the formula $$\Delta u > b/tw \ (V/m)$$

in which
   V = voltage,
   b = the distance between said partition wall and at least one of said outer pipe section and said inner pipe transverse to the direction of said ground water flow (m) in said siphon,
   w = the migration speed of the heavy metal ions (m$^2$/Vs),
   t = h/v = the mean residence time of the heavy metal ions in the said siphon (s),
   h = the siphon height (m), and
   v = the speed of said ground water flow in said siphon (m/s).

7. The method as claimed in claim 6 and further comprising:
increasing said voltage gradient to a multiple ($\Delta u'$) of a minimum value ($\Delta u$) according to the formula $$\Delta u' = n \Delta u$$

in which n = the increase factor; and
intermittently applying said voltage gradient at the ion exchange material.

* * * * *